(12) United States Patent
Kim et al.

(10) Patent No.: US 6,204,902 B1
(45) Date of Patent: Mar. 20, 2001

(54) FLEXIBLE PLATE LIQUID CRYSTAL DISPLAY DEVICE

(75) Inventors: Sun-Hwa Kim, Seoul; Byung-Hee Kim; Seung-Gon Kang, both of Kyonggi-do; Young-Il Choi, Seoul, all of (KR)

(73) Assignee: Samsung Display Devices Co., Ltd. (KR)

( * ) Notice: Subject to any disclaimer, the term of this patent is extended or adjusted under 35 U.S.C. 154(b) by 0 days.

(21) Appl. No.: 09/225,154

(22) Filed: Jan. 4, 1999

(30) Foreign Application Priority Data

Jan. 14, 1998 (KR) ................................. 98-00853
Jun. 13, 1998 (KR) ................................. 98-22128

(51) Int. Cl.[7] .............................................. G02F 1/1335
(52) U.S. Cl. .......................... 349/112; 349/158; 349/162
(58) Field of Search ........................... 349/162, 117, 349/158, 112, 113, 96, 138

(56) References Cited

U.S. PATENT DOCUMENTS

| 4,266,859 | * | 5/1981 | Togashi | 349/165 |
| 4,505,546 | * | 3/1985 | Umeda et al. | 349/158 |
| 4,586,790 | * | 5/1986 | Umeda et al. | 349/117 |
| 4,904,059 | * | 2/1990 | Torigoe | 349/138 |
| 5,227,899 | * | 7/1993 | Nobuyuki | 349/143 |
| 5,250,214 | * | 10/1993 | Kanemoto et al. | 349/117 |
| 5,724,111 | * | 3/1998 | Mizobata et al. | 349/112 |
| 6,002,464 | * | 12/1999 | Fujisawa et al. | 349/112 |

* cited by examiner

*Primary Examiner*—William L. Sikes
*Assistant Examiner*—Toan Ton
(74) *Attorney, Agent, or Firm*—Baker & McKenzie

(57) ABSTRACT

A flexible LCD device includes first and second substrates spaced away from each other in a parallel relationship. An electrode, an insulating layer, and an orientation layer are deposited on each substrate in order. A liquid crystal layer is formed between the first and second substrates. At least one of the first and second substrates is made of at least a sheet of retardation film or at least a sheet of diffuser film.

3 Claims, 2 Drawing Sheets

FLEXIBLE PLATE LIQUID CRYSTAL DISPLAY DEVICE

BACKGROUND OF THE INVENTION

1. Field of the Invention

The present invention relates to a liquid crystal display (LCD) device and, more particularly, to a flexible liquid crystal display device using a flexible plate as a substrate.

2. Description of the Prior Art

LCD device displays an image using light irradiated from a back light, then projected through a polarizing layer by an optical switching effect of a liquid crystal layer, or by using an external light reflected on the reflection layer by switching effect of the liquid crystal layer.

Nowadays, some LCD devices are manufactured such that substrates are made of a flexible plate, such as a plastic film, so that the devices can be mounted even on a non-planar surface.

For example, such an LCD device using a plastic film integrated with a polarizing layer as a substrate is disclosed in U.S. Pat. No. 4,674,840 to Bennett. The LCD device of Bennett includes a pair of substrate assemblies opposing to each other. Each of the substrate assemblies includes a flexible substrate made of, for example, polyethylene terephthalate, and a polarizing layer laminated on the substrate by means of an intermediate adhesive. Furthermore, a protective layer, a conductive layer, and an orientation layer are, in this order, deposited on the inner surface of the polarizing layer. A layer of liquid crystal material is disposed between the two substrate assemblies spaced from one another with a substantially parallel relationship. The conductive layer is positioned directly on the polarizing layer. One of the substrate assemblies optionally has a reflection layer positioned intermediate a polymeric support and the polarizing layer.

Such an LCD using the plastic film integrated with the polarizing layer as a substrate has a drawback in that the polarizing layer is weak against heat, causing problems during a high temperature manufacturing process.

U.S. Pat. No. 4,674,840 discloses a stretched polyvinyl alcohol as a suitable material to serve as the polarizing layer. However, since the polyvinyl alcohol has a melting point at 90° C., it cannot endure at an orientation layer forming temperature which is in the range of 200–240° C. Therefore, the polarizing layer have to be attached using an adhesive after a heat treatment process for forming the orientation layer is finished. As another material suitable for the polarizing layer, iodide is well-known. However, when using the iodide as the polarizing layer, it is impossible to bond the iodide to plastic substrate because the melting point of the iodide is at 80–90° C.

Furthermore, the plastic film on which the polarizing layer is laminated cannot be applied to an STN LCD since the STN LCD should be provided with a retardation film on the polarizing layer.

On the other hand, an LCD device having a structure in which a retardation film and a polarizing layer are laminated on a plastic film can be considered. However a substrate consisting of many sheets has a drawback in that the transmittance of a back light and the reflection light degrade. Also, because one of the substrate assemblies needs to have a non-directional characteristic and a birefringence index less than 15 nm, a special material should be used for this substrate assemblies, increasing manufacturing costs.

SUMMARY OF THE INVENTION

The present invention has been made in an effort to solve the above problems.

It is an object of the present invention to provide a flexible LCD device which can be made by a simple manufacturing process and enhance the light transmittance by adopting a flexible plate having a high birefringence as a main substrate, and a polarizing layer attached on the flexible plate.

It is an another object of the present invention to provide a substrate particularly suitable to an STN LCD in which a retardation film is essentially required.

It is an another object of the present invention to provide a substrate also suitable to TN and TFT LCDs.

To achieve the above objects, the present invention provides a flexible LCD device comprising first and second substrates spaced away from each other in a parallel relationship; electrodes, insulating layers, and orientation layers deposited on each substrate in order; a polarizing layer provided on an outer surface of at least one of the first and second substrates; and a liquid crystal layer formed between the first and second substrates, wherein, at least one of the first and second substrates is made of a film selected from at least a sheet of retardation film and at least a sheet of diffuser film.

In a transmittance STN LCD, both substrates are made of the retardation film, and in a reflection STN LCD, the first substrate is made of the retardation film and the second substrate is made of a plastic plate deposited with a reflection layer. Preferably a diffuser film may be provided between the polarizing layer and the first substrate or on a outer surface of the polarizing layer in a STN LCD.

In a TN and TFT LCD, the first substrate is made of the diffuser film, the second substrate is made of a plastic plate deposited with or without a reflection layer.

The diffuser film is made by depositing a diffuser layer on a base layer.

BRIEF DESCRIPTION OF THE DRAWINGS

The accompanying drawings, which are incorporated in and constitute a part of the specification, illustrate an embodiment of the present invention, and together with the description, serve to explain the principles of the invention.

DETAILED DESCRIPTION OF PREFERRED EMBODIMENTS

Preferred embodiments of the present invention will be hereinafter described with reference to the accompanying drawings. Wherever possible, the same reference numbers will be used throughout the drawings to refer to the same or like parts.

Figure 1:
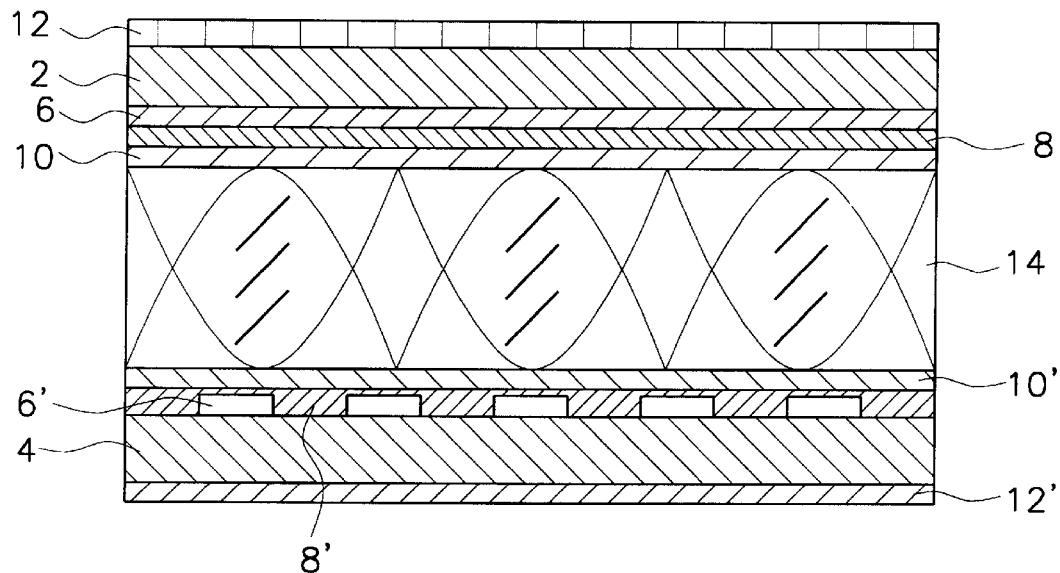
FIG. 1 is a cross-sectional view of a flexible transmittance STN LCD device according to a first embodiment of the present invention.

FIG. 1 is a cross-sectional view of a transmittance type STN LCD where a first embodiment of the present invention is employed. The LCD device includes a first substrate 2 and a second substrate 4 spaced away from and facing each other. Both of the substrates 2 and 4 consists of one or more flexible sheets. On the inner surfaces of the substrates 2 and 4, transparent electrodes 6 and 6' are formed. The electrodes 6 and 6' may be arranged to be driven in a passive mode or an active mode. The electrodes 6 and 6' can be formed by a sputtering method.

Insulating layers 8 and 8' and orientation layers 10 and 10' are, in this order, formed on the substrates 2 and 4 to cover the electrodes 6 and 6'. The substrates 2 and 4 are sealed by a sealant (not shown) such that a space, in which a liquid crystal layer is disposed, is formed therebetween. After this, polarizing layers 12 and 12' are laminated on the outer surfaces of the substrates 2 and 4.

Between the polarizing layer 12 and the substrate 2 or on a outer surface of the polarizing layer 12, a diffuser film (not shown) can be disposed, and also a color filter (not shown) can be provided on the inner or outer surfaces of the substrate 2 for realizing a color display.

As a feature of the present invention, at least a sheet of retardation film is used as the substrates 2 and 4 to realize a birefringence characteristic essentially required in the STN LCD. If desired, two or more sheets of retardation films can be piled up to obtain various birefringence.

If the birefringence of the first substrate 2 is horizontal, the second to substrate 4 should be set having a birefringence of 45°0 with respect to the horizontal index. As is well-known, since a main component of the retardation film is a polymer, it is possible to obtain various retardation films, each having a unique compensation value, according to the kind of polymer or the heating process. Therefore, by piling a plurality of retardation films, desired birefringence of STN LCDs can be obtained and such an LCD operates in the same manner when operating using a $\lambda/4$ substrate.

Figure 2:
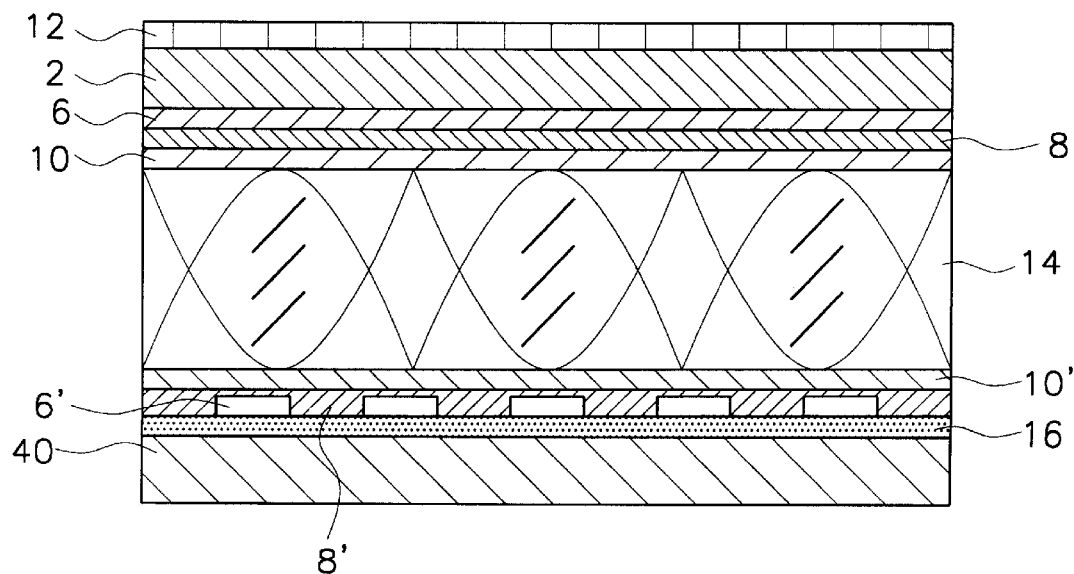
FIG. 2 is a cross-sectional view a of a flexible reflection STN LCD device according to a second embodiment of the present invention.

FIG. 2 shows a reflection type STN LCD where a second embodiment of the present invention is applied. As shown in FIG. 2, a retardation film is used as an first substrate 2, while other flexible plate such as a plastic plate is used for a second substrate 40. A reflection layer 16 is formed on the second substrate 40. On the inner surfaces of the first and second substrates 2 and 40, transparent electrodes 6 and 6', insulating layers 8 and 8', and orientation layers 10 and 10' are deposited in this order. A liquid crystal layer 14 is formed between the orientation layers 10 and 10'. After this, a polarizing layer 12 is laminated on the outer surface of the first substrate 2.

A diffuser film(not shown) can be provided between the polarizing layer 12 and the substrate 2 or on a outer surface of the polarizing layer 12, , and also a color filter (not shown) can be provided on the inner or outer surfaces of the substrate 2 for realizing a color display.

The transparent electrodes 6 and 6' can be formed by sputtering method, and the reflection layer 16 can be formed by deposition of an aluminum film.

Figure 3:
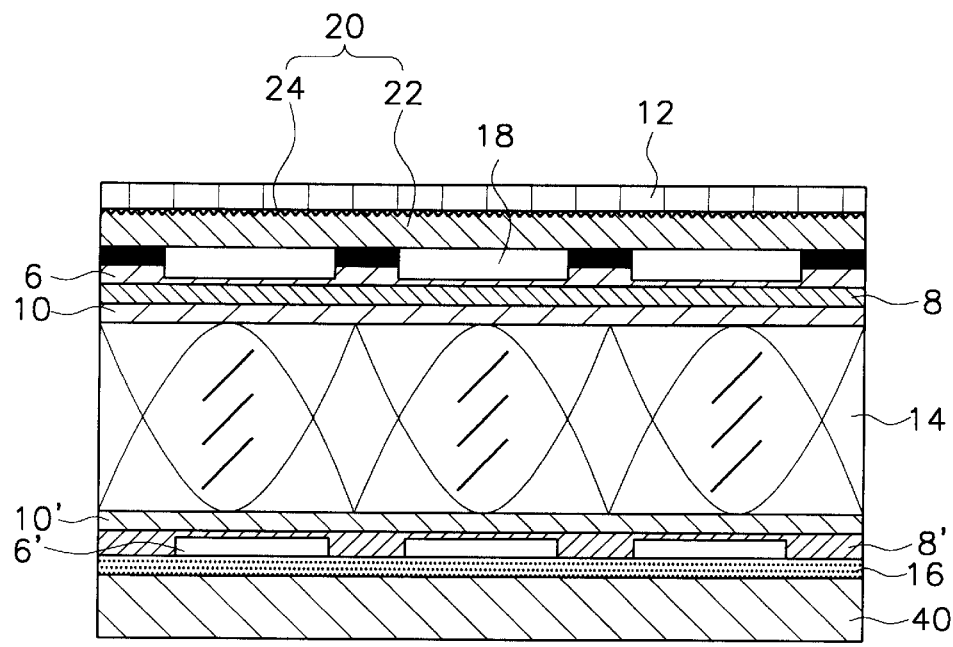
FIG. 3 is a cross-sectional view of a flexible TN LCD device according to a third embodiment of the present invention.

FIG. 3 shows a TN type flexible LCD device where a third embodiment of the present invention is employed.

As shown in FIG. 3, the TN LCD device is a reflection type, which has no back light. The TN LCD comprises first and second substrates 20 and 40 made of flexible material. That is, the first substrate 20 is made of a diffuser film. The second substrate 40 is made of other flexible plate such as a plastic plate.

Describing more in detail, the diffuser film 20 is made by depositing a diffuser layer 24, a main component of which is silica, on a base layer 22 made of a plastic material. The base layer 22 may be made of polycarbonate having a thermal resistance of 160–200° C. and isotropy. A color filter 18 is formed on the inner surface of the first substrate 20.

On the other hand, a reflection layer 16 is formed by depositing aluminum film.

In addition, transparent electrodes 6 and 6', insulating layers 8 and 8', and orientation layers 10 and 10' are deposited on the first and second substrates 20 and 40 in order. The first and second substrates 20 and 40 are assembled by means of sealant (not shown in drawings) such that a space, in which a liquid crystal layer 14 is disposed, is formed. After this, a polarizing layer 12 is laminated on the outer surface of the first substrate 20.

Figure 4:
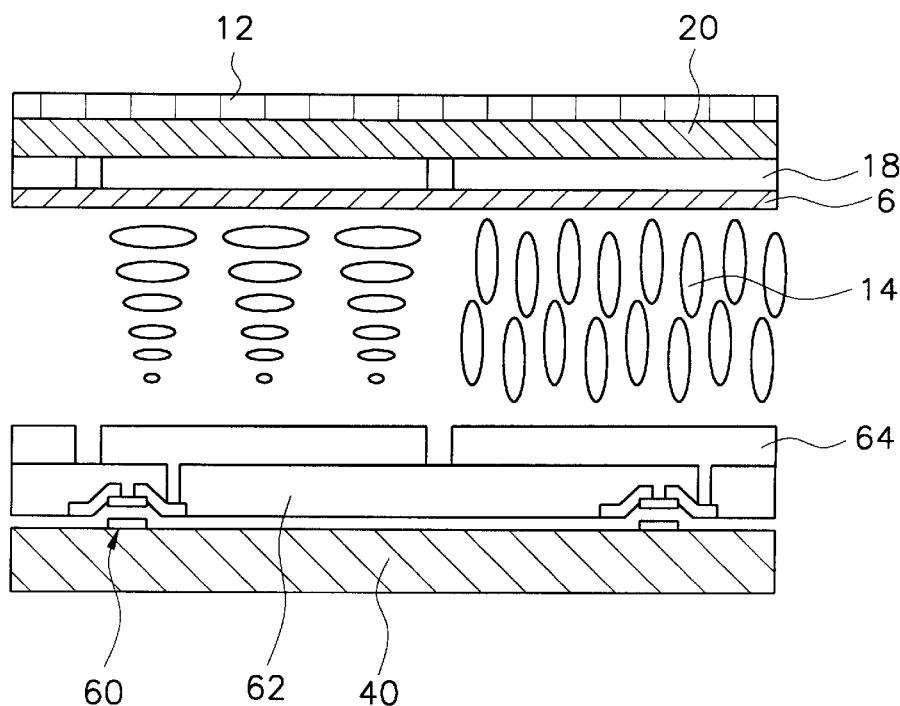
FIG. 4 is a cross-sectional view of a flexible TFT LCD device according to a fourth embodiment of the present invention.

FIG. 4 shows a reflection type TFT LCD where a preferred embodiment of the present invention is employed.

A first substrate 20 is made of a diffuser film, on an inner surface which a color filter 18 and a transparent electrode 6 are formed. A second substrate 40 is made of other flexible material.

A pixel electrode 64 which acts as a reflecting layer, a thin film transistor 60, and an insulating layer 62 are formed on an inner surface of the second substrate 40.

In addition, insulating layers and orientation layers (not shown in drawings) are deposited on the transparent electrode and the pixel electrode 6 and 64 in order, respectively.

The first and second substrates 20 and 40 are assembled by means of sealant (not shown in drawings) such that a space, in which a liquid crystal layer 14 is disposed, is formed. After the liquid crystal layer 14 is formed, a polarizing layer 12 is laminated on the outer surface of the first substrate 20. Also, a retardation film may be laminated on the first substrate 20.

In the above described TN and TFT LCDs, when an external light is transmitted to the liquid crystal layer 14 through the first substrate 20 made of the diffuser film 12 and the polarizing layer 12 is reflected on the reflection layer 16 of the second substrate 40 when electric field is applied to the liquid crystal layer 14, and then projected to the first substrate 20, thereby displaying a desired image.

Although preferred embodiments of the present invention have been described in detail herein above, it should be clearly understood that many variations and/or modifications of the basic inventive concepts herein taught which may appear to those skilled in the present art will still fall within the spirit and scope of the present invention, as defined in the appended claims.

What is claimed is:

1. A flexible LCD device comprising:
    a first flexible substrate comprising at least a diffuser film;
    a second flexible substrate comprising at least a plastic plate, the first and second substrates spaced away from each other in a parallel relationship;
    an electrode, an insulating layer, and an orientation layer deposited on each substrate in order;
    a polarizing layer provided on an outer surface of at least one of the first and second substrates; and
    a liquid crystal layer formed between the first and second substrates.

2. The flexible LCD device of claim 1, wherein the plastic plate is deposited with a reflection layer.

3. The flexible LCD device of claim 1, wherein the diffuser film comprises at least a diffuser layer deposited on a base layer.

* * * * *